(12) United States Patent  (10) Patent No.: US 7,692,347 B2
Nakajima  (45) Date of Patent: Apr. 6, 2010

(54) VIBRATION DAMPING FOR A ROTATING SHAFT

(75) Inventor: Tsuyoshi Nakajima, Sagamihara (JP)

(73) Assignee: Nissan Motor Co., Ltd., Yokohama (JP)

( * ) Notice: Subject to any disclaimer, the term of this patent is extended or adjusted under 35 U.S.C. 154(b) by 294 days.

(21) Appl. No.: 10/573,634

(22) PCT Filed: Oct. 11, 2005

(86) PCT No.: PCT/IB2005/003015

§ 371 (c)(1),
(2), (4) Date: Mar. 28, 2006

(87) PCT Pub. No.: WO2006/051361

PCT Pub. Date: May 18, 2006

(65) Prior Publication Data

US 2009/0015085 A1    Jan. 15, 2009

(30) Foreign Application Priority Data

Oct. 12, 2004 (JP) .............................. 2004-297391
Oct. 7, 2005 (JP) .............................. 2005-295449

(51) Int. Cl.
 *H02K 5/01* (2006.01)
(52) U.S. Cl. .......................................... 310/90; 310/51
(58) Field of Classification Search .................. 310/90, 310/51–52, 83, 98, 99
See application file for complete search history.

(56) References Cited

U.S. PATENT DOCUMENTS

| 5,110,257 A | * | 5/1992 | Hibner et al. ............... 415/119 |
| 5,244,285 A |   | 9/1993 | Hagstedt et al. |
| 2004/0149511 A1 | * | 8/2004 | Shimizu et al. ............. 180/443 |

FOREIGN PATENT DOCUMENTS

| GB | 2 111 136  | 6/1983 |
| JP | 7-156673   | 6/1995 |
| JP | 2000130177 | 5/2005 |

OTHER PUBLICATIONS

Notification of Transmittal of the International Search Report and the Written Opinion of the International Searching Authority for corresponding International Application No. PCT/IB2005/003015, mailed Feb. 2, 2006, 14 pages.

* cited by examiner

*Primary Examiner*—Quyen Leung
*Assistant Examiner*—Leda Pham
(74) *Attorney, Agent, or Firm*—Global IP Counselors, LLP

(57) ABSTRACT

The invention provides damping techniques for a rotating shaft. The rotating shaft is supported by rotary bearings. The damping techniques control vibration of the rotating shaft by creating a fluid film in a support element of the rotating shaft. For example, the fluid film may be created between a housing and the rotary bearings. The fluid may be supplied by a pump, and the supply amount of fluid to create the fluid film is relative to the rotational velocity of the shaft. Vibration can be prevented for every operational rotational velocity of the rotating shaft. In some embodiments, the rotating shaft may be powered by or part of an electric motor for a vehicle.

14 Claims, 14 Drawing Sheets

VIBRATION DAMPING FOR A ROTATING SHAFT

This application is a National Stage filing under 35 USC 371 of International Application No. PCT/IB2005/003015, filed Oct. 11, 2005, which claims priority to Japanese Patent Application No. 2005-295449, filed Oct. 7, 2005, and Japanese Patent Application No. 2004-297391, filed Oct. 12, 2004, the entire contents of each of which is incorporated herein by reference.

TECHNICAL FIELD

The invention relates to techniques for damping vibration in a rotating shaft.

BACKGROUND

Conventionally, in a device with a shaft that rotates at high speed, e.g., high speed electric motor or a turbocharger, an oil film damper is placed in a rotary bearing to prevent vibration of the shaft.

For example, a conventional turbocharger has a shaft which rotates at a high rotational velocity. The shaft is supported by an angular ball bearing and damper. A lubricating oil is filled in a gap created between the damper and a side brake and the angular ball bearing is stably supported by the damping effect of the oil film.

However, the amount of the supplied lubricating oil is constant regardless of the rotational velocity the shaft. It is possible for vibration of the shaft to occur at particular rotational velocities.

SUMMARY

The present invention relates to a damping device for damping vibration in a rotating shaft. For example, an electric motor for a vehicle equipped with a damping device. Embodiments of the invention control vibrations by creating a fluid film in the support element of the rotating shaft. The fluid film is maintained over all operational speeds of the shaft by a fluid film creating element.

A damping device may include a fluid film creating element which creates a fluid film between a roller bearing which rotatably supports a rotating shaft and a roller bearing support element which supports the roller bearing, and a fluid body supplying means which supplies a fluid body to the fluid film creating element. The fluid body supplying means increases the supply amount of the fluid body which is supplied to the fluid film creating element when the number of the rotating shaft is relatively large.

A damping device may include a fluid film creating element which creates a fluid film between the roller bearing and the roller bearing support element and a fluid body supplying means which supplies the fluid body to the fluid film creating element. The fluid body supplying means increases the supply amount of the fluid body to the fluid film creating element when the rotating shaft rotates at a relatively high speed. As a result, resonance can be prevented even when the rotational velocity of the rotating shaft is changed.

In one embodiment, a damping device comprises a fluid film creating element which creates a fluid film between a roller bearing which rotatably supports a rotating shaft and a roller bearing support element which supports the roller bearing and a fluid supply element. The fluid supply element supplies a fluid body to the fluid film creating element and increases the supply amount of the fluid body which is supplied to the fluid film creating element when a rotational velocity of the rotating shaft is relatively high.

In an embodiment a system comprises an electric motor for a vehicle that supplies a driving force for the vehicle by rotating a rotating shaft, roller bearings that rotatably support the rotating shaft, a housing that supports the roller bearings, a circular-shaped member that creates an oil film between at least one of the roller bearings and the housing and an oil pump that supplies oil to the circular-shaped member. The oil pump increases the supply of the oil when the rotating shaft rotates at a relatively high rotational velocity.

In another embodiment, a method comprises providing a supply of oil to a circular-shaped member that creates an oil film between at least one roller bearing and a housing, wherein the at least one roller bearing supports a rotating shaft and adjusting the supply of oil relative to a rotational velocity of the rotating shaft.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
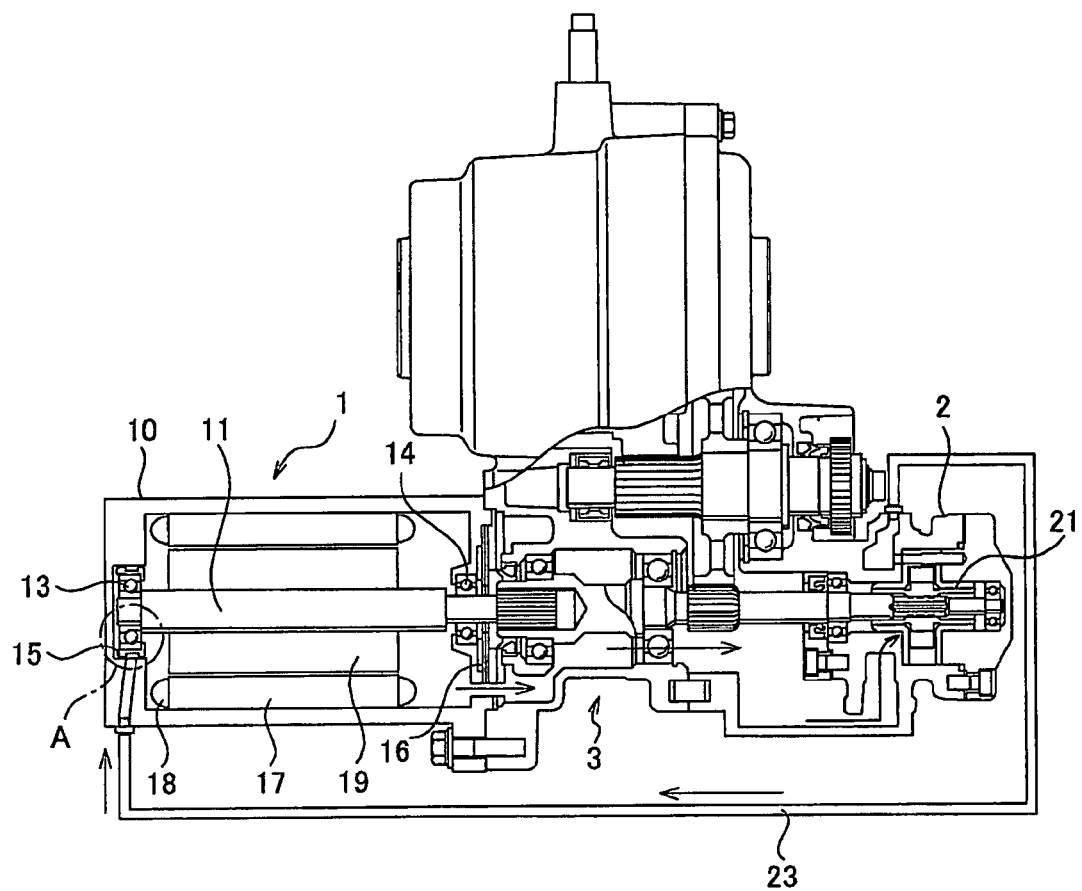
FIG. 1 is a cross-sectional view illustrating the structure of the electric motor for a vehicle of a first exemplary embodiment.

FIG. 1 is a cross-sectional view illustrating a structure of the damping device, the electric motor for a vehicle and the driving device for a vehicle of the first exemplary embodiment. As shown in FIG. 1, electric motor for a vehicle 1 of the present embodiment is integrally connected to reduction gear 3 equipped with oil pump 2. On the center shaft of cylindrical housing 10, both ends of rotating shaft 11 are rotatably supported by two bearings, bearings 13 and 14. Bearing 13 has oil film damper 15 which prevents resonance of the rotating body by an oil film and retainer 16 is placed in reduction gear 3 of bearing 14. For example, angular ball bearings may be used as bearings 13 and 14.

Here, according to the present embodiment, retainer 16 is placed in one of bearings 14 so as to facilitate the positioning of electric motor for a vehicle 1, but oil film damper 15 may be placed in line in bearings 13 and 14. For a better understanding of the structure, FIG. 1 shows a cross-sectional view of electric motor for a vehicle 1 which is viewed from its rear side and a cross-sectional view of oil pump 2 and reduction gear 3 which are viewed from the front side of the vehicle.

Also, a stator is created on the inner wall of housing 10 by circular-shaped stator core 17 and coil 18 which is placed on stator core 17. Rotor 19 made from a circular-shaped iron core and fixed to rotating shaft 11 is placed on the inner wall of stator core 17. The iron core constituting rotor 19 is created by laminating a plurality of thin plates made of magnetic material such as iron in the direction of rotating shaft 11.

Oil pump 2 absorbs the oil inside reduction gear 3 as rotating shaft 21 rotates and discharges the oil to oil path 23 supplying it to oil film damper 15. Oil pump 2 may be a pump such as a vane pump, which can absorb and discharge the oil as rotating shaft 21 rotates. Rotating shaft 21 of oil pump 2 is connected to rotating shaft 11 of electric motor for a vehicle 1 so that rotating shaft 21 can integrally rotate with rotating shaft 11. Here, oil is stored inside housing 10 and in a case located in reduction gear 3 respectively so that rotating shaft 11 of electric motor for a vehicle 1 and rotating shaft 21 of oil pump 2 are immersed.

Furthermore, the discharge amount and pressure of the oil by oil pump 2 increases and decreases in relation to the rotational velocity of rotating shaft 21. However, the discharge amount and pressure of the oil are not necessarily relative to the rotational velocity of rotating shaft 21. Oil pump 2 is only required to supply the amount of the oil needed for oil film damper 15 according to the rotation of rotating shaft 11.

Figure 2:
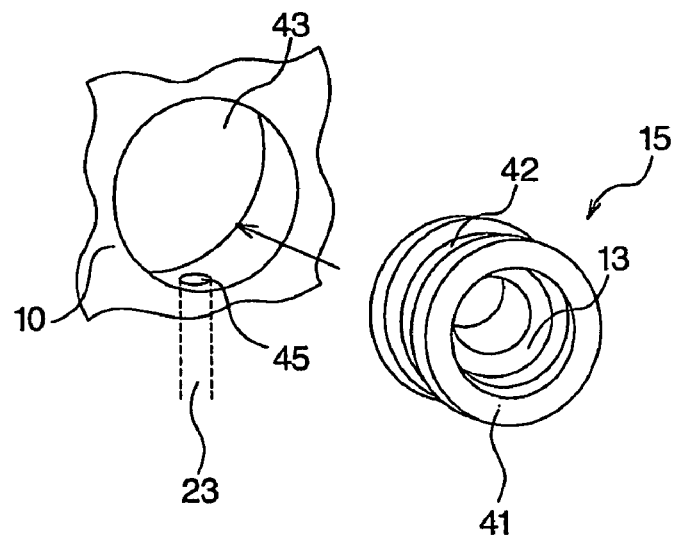
FIG. 2 is an enlarged perspective view illustrating the structure of oil film damper of the electric motor for a vehicle of the first exemplary embodiment.
Figure 3:
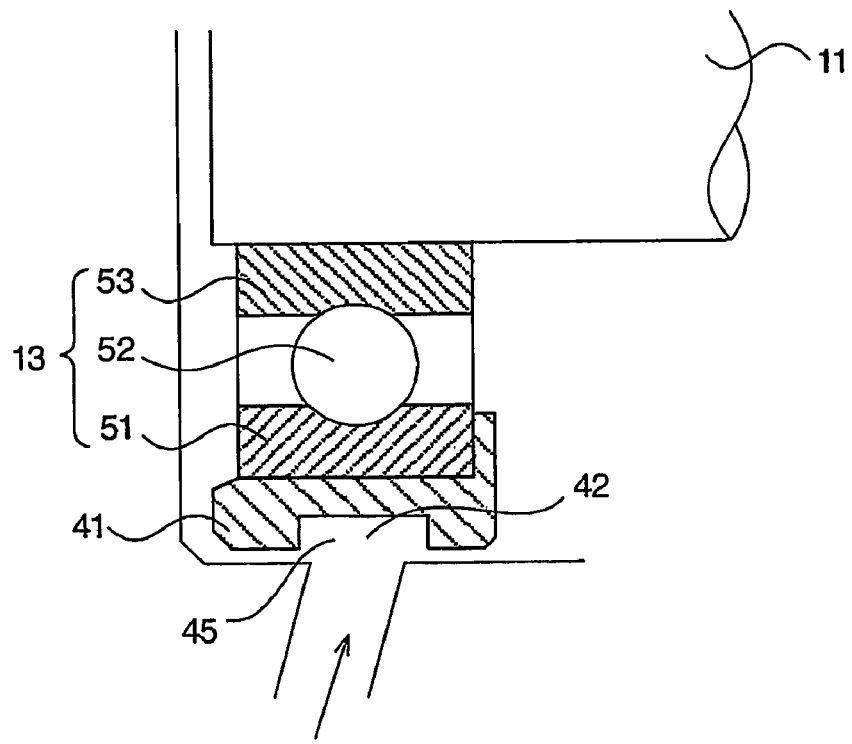
FIG. 3 is an enlarged cross-sectional view illustrating element A of FIG. 1 to explain the structure of oil film damper of the electric motor for a vehicle of the first exemplary embodiment.

The structure of oil film damper 15 is described based on FIGS. 2 and 3. FIG. 2 is an enlarged perspective view illustrating the structure of oil film damper of FIG. 1. FIG. 3 is an enlarged cross-sectional view illustrating element A of FIG. 1.

As shown in FIG. 2, in oil film damper 15, oil puddle concave element 42, a fluid film creating element, is created in the entire circumference of circular-shaped race 41 and bearing 13 is engaged in the inner circumference. Oil film damper 15 is inserted into rotating shaft inserting hole 43 of housing 10. As shown in FIG. 3, outer race 51 of bearing 13 is fixed to the inner side of race 41, bearing ball 52 and inner race 53 are placed inside outer race 51 and rotating shaft 11 is engaged in and rotatably supported by the inner side of inner race 53.

Oil is supplied through oil supply entrance 45 to oil puddle concave element 42 of race 41 lubricating bearing 13 as well as preventing resonance caused by rotating shaft 11. Although FIG. 2 has only one oil supply entrance 45, several oil supply entrances may be created. In this case, oil supply entrances 45 may be arranged around rotating shaft inserting hole 43 in a radial manner.

In electric motor for a vehicle with the above described structure, since the temperature of the inside and outside of electric motor for a vehicle is different during the rotation, there are differences of axial length of rotating shaft 11. Therefore, in order to absorb the difference of the length, a gap is created between bearing 13 and housing 10. However, due to this gap, resonance is generated in rotating shaft 11, oil is supplied to oil film damper 15 to prevent vibration.

Since oil pump 2 discharges oil according to the rotational velocity of rotating shaft 21 which integrally rotates with rotating shaft 11, the amount of the oil supplied to oil film damper 15 increases and decreases depending on the rotational velocity of rotating shaft 11. The amount of the oil discharged from oil pump 2 is relative to the rotational velocity of rotating shaft 21. Therefore, the amount of the oil supplied to oil film damper 15 also increases in relation to the rotational velocity of rotating shaft 11.

In this way, when the amount of oil supplied to oil film damper 15 is changed according to the rotational velocity of rotating shaft 11, may be more effective to prevent resonance of rotating shaft 11 compared with the case where the amount of oil is constant. For example, when the amount of the oil supplied to oil film damper 15 is constant, if the maximum rotational velocity of rotating shaft 11 is kept low, it is possible to prevent resonance of rotating shaft 11. However, if the maximum rotational velocity of rotating shaft 11 is increased, resonance cannot be prevented at a certain point. On the other hand, in order to prevent resonance even if the rotational velocity of rotating shaft 11 is increased, it is necessary to increase the amount of the oil supplied to oil film damper 15. According to the present embodiment, oil pump 2 increases the amount of the oil supplied in relation to the rotational velocity. Therefore, when the rotational velocity is high which requires more oil, it is possible to supply a large amount of oil. Therefore, it is possible to prevent resonance of rotating shaft 11 in any rotational velocity.

Figure 7:
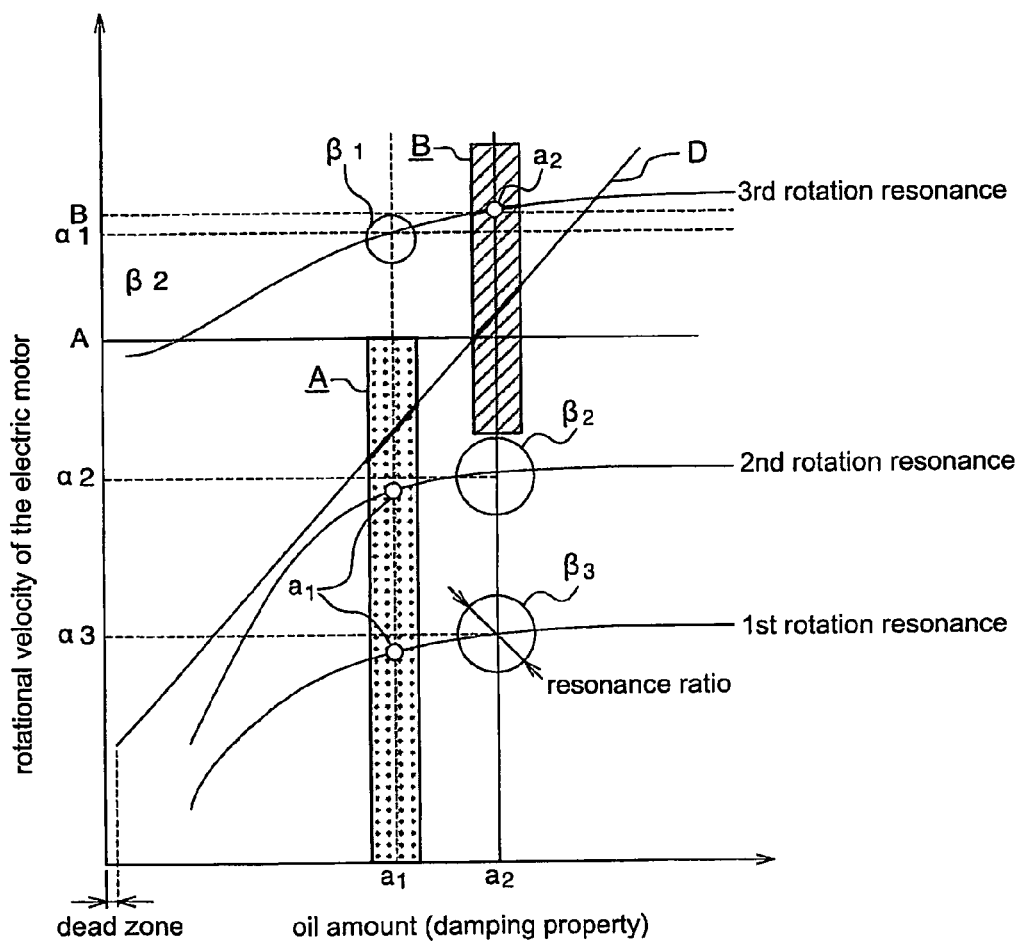
FIG. 7 is a rheogram showing the relationship among the rotational velocity of the electric motor, amount of the oil which is supplied to the oil film damper 15 and the resonance property of the electric motor.

FIG. 7 is a rheogram showing the relationship among the rotational velocity of the electric motor (rotational velocity of rotating shaft 11), amount of oil which is supplied to oil film damper 15 (hereinafter called oil amount) and resonance property of the electric motor (vibration property of rotating shaft 11). In FIG. 7, the center point of the circle represents the rotational velocity of the electric motor and the oil amount when resonance is generated. The size of the diameter of the circle represents resonance ratio. Also, the 1st to 3rd rotation vibrations which are the vibration property of the electric motor are the frequency when the vibration wave is analyzed (FIG. 7 shows up to the 3rd rotation vibration).

When the oil amount is constant at a1, up to a rotational velocity of A, resonance can be prevented. That is, the 1st and 2nd rotation vibrations fall within the range which indicates the solution when the rotational velocity of the electric motor is A (range of under bar A). However, when the rotational velocity of the electric motor increases and reaches α1, the 3rd rotation resonance goes beyond the area of under bar A. As a result, the 3rd rotation resonance has a low decrease rate and cannot decrease resonance generated in β1 (see β1 in the figure). Therefore, when the oil amount is a1 and the rotational velocity of the electric motor is α1 or larger, resonance cannot be prevented.

On the other hand, if the oil amount is a2, the electric motor can rotate with rotational velocity B without generating the 3rd rotation resonance (the rotational velocity within the range of under bar B has a high decrease rate). However, in this case, when the electric motor rotates with rotational velocity α2 and α3, the 1st rotation resonance and 2nd rotation resonance have low decrease rate and cannot decrease resonance generated in β2 and β3. In this way, when the oil amount is constant, regardless of the oil amount, there is a range of the rotational velocity where resonance cannot be prevented.

In contrast, according to an embodiment of the invention, the rotational velocity (rotational velocity of rotating shaft 11) of the electric motor increases based on the oil amount. The increase property of the oil amount to the increase of the rotational velocity, that is, the property of oil pump 2 becomes the property of range D of the figure. As a result, even when the electric motor rotates with rotational velocity A or larger, it can prevent the 3rd vibration while preventing the 1st and 2nd vibration.

The oil supplied from oil pump 2 to oil film damper 15 as described above is discharged into the case located in reduction gear 3 passing through electric motor for a vehicle 1 as shown with the arrows. Then, the oil stored in the case in reduction gear 3 is absorbed into oil pump 2 after lubricating reduction gear 3 and discharged to oil path 23 and circulates. Here, the oil is stored in the case inside housing 10 or in the case located in reduction gear 3 so that rotating shaft 11 of electric motor for a vehicle 11 and rotating shaft 21 of oil pump 2 are immersed.

As described above, according to electric motor for a vehicle 1 of the present embodiment, since oil is supplied to oil film damper 15 based on the rotational velocity of rotating shaft 11, it is possible to effectively prevent resonance of rotating shaft 11 with each rotational velocity. Furthermore, according to the present embodiment, since the maximum rotational velocity of the electric motor is not limited by resonance, it is possible to assemble the electric motor more uninhibitedly.

Moreover, according to the present embodiment, since the oil which lubricates oil film damper 15 passes through electric motor for a vehicle 1 and discharged into reduction gear 3, it is possible to use the inside of the electric motor for a vehicle 1 as the oil path.

Additionally, the electric motor for a vehicle 1 of the present embodiment has oil pump 2 which is connected to rotating shaft 11 and oil pump 2 changes the amount and pressure of the oil which is supplied to oil film damper 15 based on the rotational velocity of rotating shaft 11. As a result, in conjunction with the rotational velocity of rotating shaft 11, oil pump 2 can prevent resonance of rotating shaft 11 at any rotational velocity.

Figure 4:
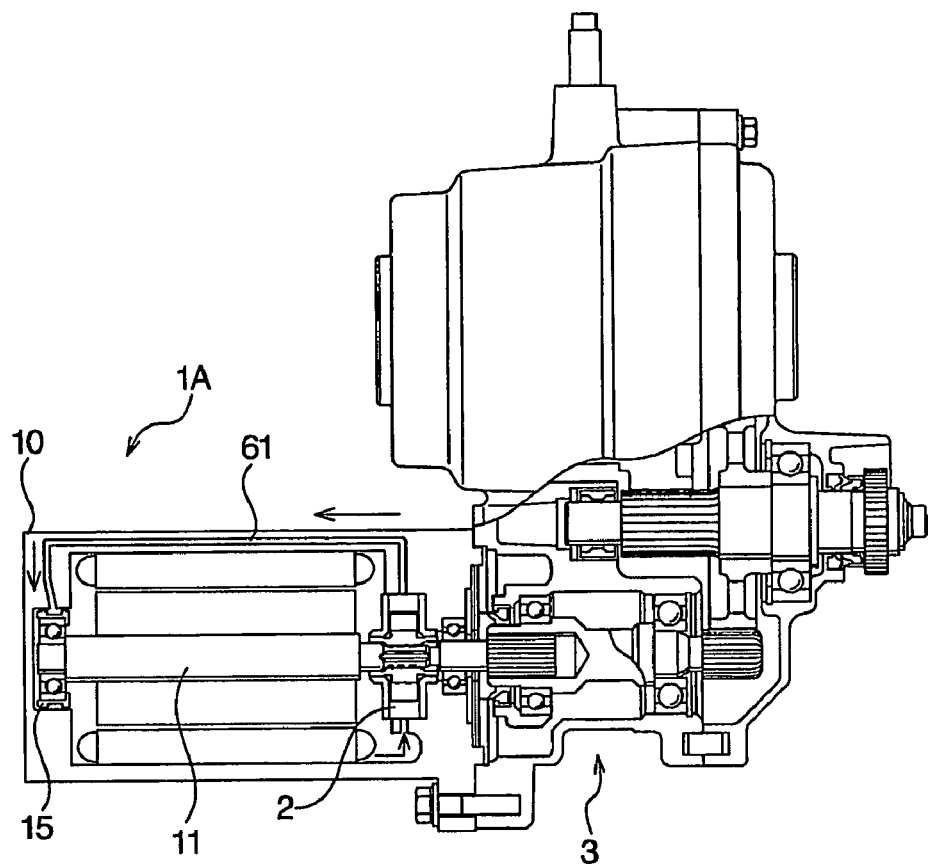
FIG. 4 is a cross-sectional view of the structure of the electric motor for a vehicle of a second exemplary embodiment.

FIG. 4 is a cross-sectional view illustrating the structure of the electric motor for a vehicle of the second exemplary embodiment. As shown in FIG. 4, according to the present embodiment, oil pump 2 is placed inside housing 10 of electric motor for a vehicle 1A so that oil path 61 through which oil is supplied from oil pump 2 to oil film damper 15 passes through housing 10. Since other structures are the same as those of the first exemplary embodiment, their explanation is omitted.

Oil pump 2 shown in FIG. 4 is a pump made for absorbing and discharging the oil in relation to the rotational velocity of rotating shaft 11 in a manner similar to the first exemplary embodiment. Therefore, as shown with the arrows in FIG. 4, the oil pump absorbs the oil which passes through electric motor for a vehicle 1A and discharges it to oil path 61 with the amount and pressure of the oil which are relative to the rotational velocity of rotating shaft 11.

Oil path 61 is placed in the axial direction of rotating shaft 11 inside housing 10 and supplies the oil which is discharged from oil pump 2 to oil film damper 15. The oil supplied to oil film damper 15, after passing through electric motor for a vehicle 1A, is absorbed again by oil pump 2 and discharged to oil path 61 and recycled. In this way, according to the electric motor for a vehicle 1A of the present embodiment, oil path 61 for supplying oil from oil pump 2 to oil film damper 15 is placed in an axially extending direction inside housing 10. Therefore, it is possible to cool down electric motor for a vehicle 1A by the oil used for preventing resonance of rotating shaft 11.

Furthermore, according to the electric motor for a vehicle 1A, since oil pump 2 is placed inside housing 10, it is possible to recycle the oil only in the electric motor for a vehicle 1A. As a result, it is possible to make oil with different properties between the oil of reduction gear 3 and that of electric motor for a vehicle 1A. Therefore, a kind of the oil which has little effect on the insulating material can be selected for the electric motor for a vehicle 1A and it is possible to use an optimum oil for the electric motor for a vehicle 1A.

Figure 5:
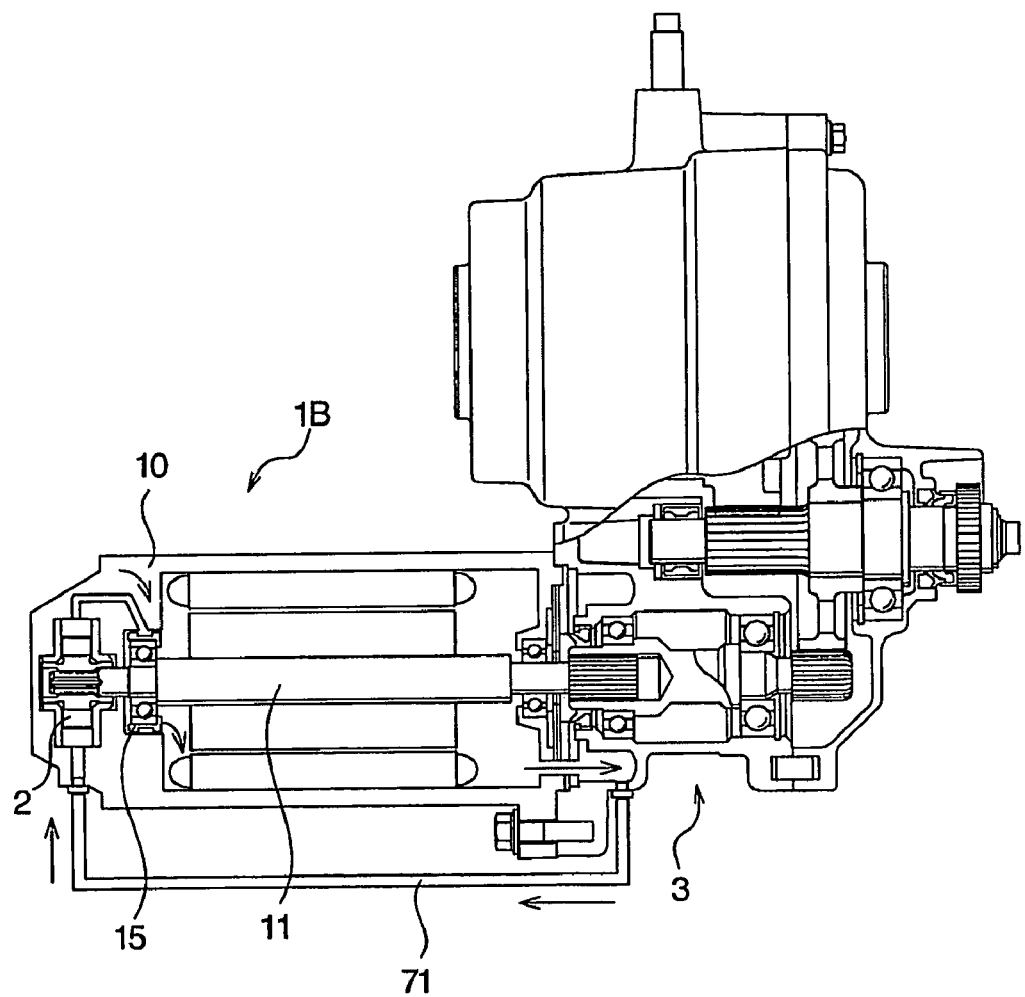
FIG. 5 is a cross-sectional view of the structure of the electric motor for a vehicle of a third exemplary embodiment.

FIG. 5 is a cross-sectional view illustrating the structure of the electric motor for a vehicle of the third exemplary embodiment. As shown in FIG. 5, according to the present embodiment, oil pump 2 is placed inside housing 10 of electric motor for a vehicle 1B and the location of the oil pump 2 is in the side of oil film damper 15.

Furthermore, the present embodiment is different from the first exemplary embodiment in that it has oil path 71 which supplies oil from reduction gear 3 to oil pump 2. Since other structures are the same as those of the first exemplary embodiment, their explanation is omitted.

Oil pump 2 shown in FIG. 5 is a pump made for absorbing and discharging the oil in relation to the rotational velocity of rotating shaft 11 in a manner similar to the first exemplary embodiment. As shown with the arrows in FIG. 5, oil pump 2 absorbs the oil which passes from reduction gear 3 through oil path 71 and discharges it to oil film damper 15 with the amount and pressure of the oil which are relative to the rotational velocity of rotating shaft 11.

The oil which recycles oil film damper 15 passes through electric motor for a vehicle 1 and is discharged to reduction gear 3. Then, after passing from reduction gear 3 through oil path 71, the oil is again absorbed by oil pump 2 and discharged to oil film damper 15 and recycles.

In this way, according to the electric motor for a vehicle 1B of the present embodiment, reduction gear 3 is connected to the end where oil film damper 15 of rotating shaft 11 is not placed and oil pump 2 is placed in the end where oil film damper 15 of rotating shaft 11 is placed. As a result, the oil which lubricates oil film damper 15 passes through the electric motor for a vehicle 1B and is discharged to reduction gear 3. Therefore, it is possible to use the inside of the electric motor for a vehicle as the oil path. By using the oil for preventing resonance of rotating shaft 11, it is possible to cool down electric motor for a vehicle 1B.

Figure 6:
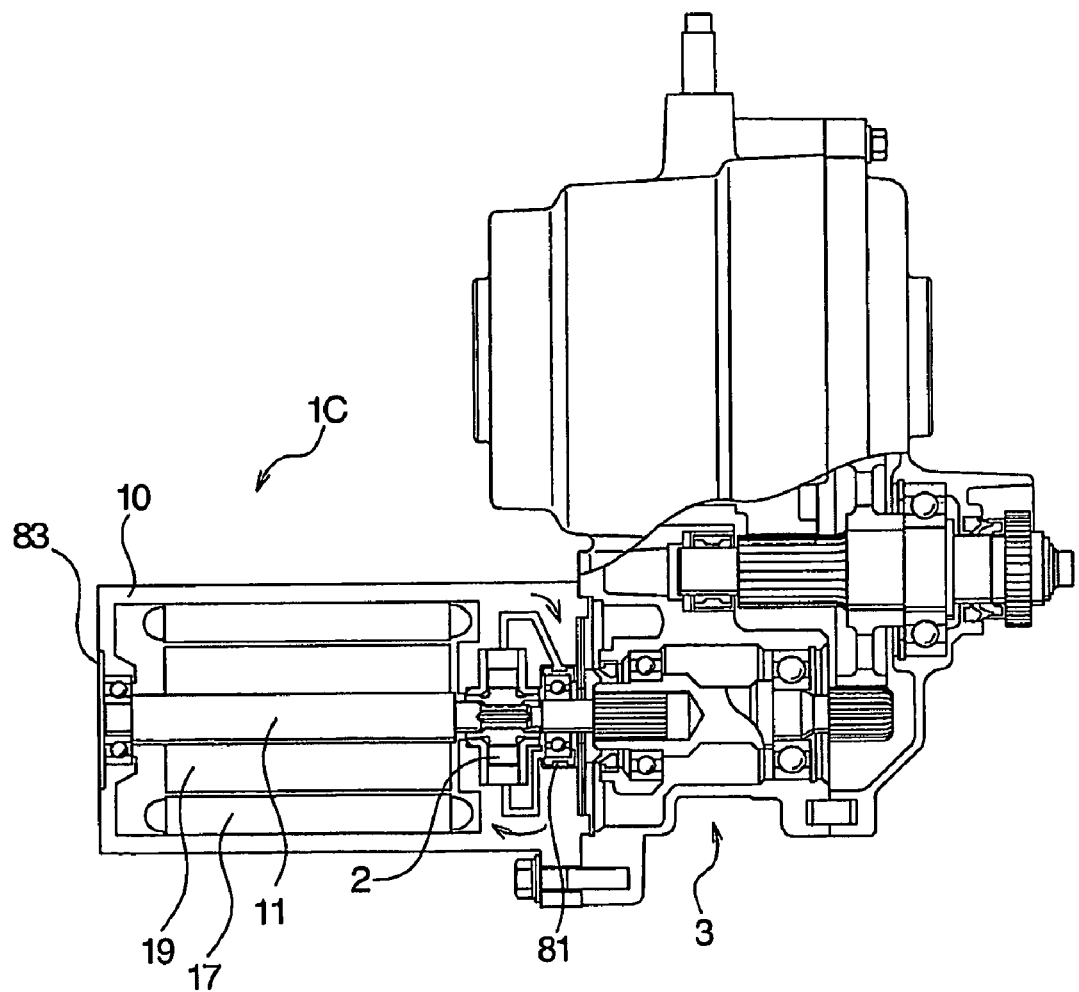
FIG. 6 is a cross-sectional view of the structure of the electric motor for a vehicle of a fourth exemplary embodiment.

FIG. 6 is a cross-sectional view illustrating the structure of the electric motor for a vehicle of the fourth exemplary embodiment. As shown in FIG. 6, the present embodiment is different from the first exemplary embodiment in that oil film damper 81 and oil pump 2 are placed in the side of reduction gear 3 of rotating shaft 11 and retainer 83 is placed in the opposite side of rotating shaft 11. Since other structures are the same as those of the first exemplary embodiment, their explanation is omitted. Oil pump 2 shown in FIG. 6 is a pump made for absorbing and discharging the oil in relation to the rotational velocity of rotating shaft 11 in a manner similar to the first exemplary embodiment. As shown with the arrows in FIG. 6, oil pump 2 absorbs the oil which lubricates oil film damper 81 and discharges it with the amount and pressure of the oil which are relative to the rotational velocity of rotating shaft 11.

Also, although not shown in the figure, after discharging the oil which lubricates oil film damper 81 to reduction gear 3, oil pump 2 may absorb it from reduction gear 3 and recycle it.

In this way, the electric motor for a vehicle 1C of the present embodiment has oil film damper 81 and oil pump 2 in the end which is connected to reduction gear 3 of rotating shaft 11. Therefore, the space between rotor 19 and stator core 17 of the electric motor for a vehicle 1C can be easily maintained dry and no viscosity resistance is generated by oil between rotor 19 and stator core 17.

Furthermore, according to the present embodiment, since oil pump 2 is placed adjacent to oil film damper 81, the oil path can be shortened. However, the total amount of the oil becomes small and deterioration of the oil may increase. In this case, by making the case of reduction gear 3 in a convex shape in a vertical direction of the vehicle, oil can be stored in the case and the case of reduction gear 3 can be used as the drain tank of oil pump 2. In this way, if the case of reduction gear 3 which is placed adjacent to oil film damper 81 is used as the drain tank for storing oil, it is possible to increase the total amount of oil with the shortened oil path and prevent deterioration of the oil.

Figure 8:
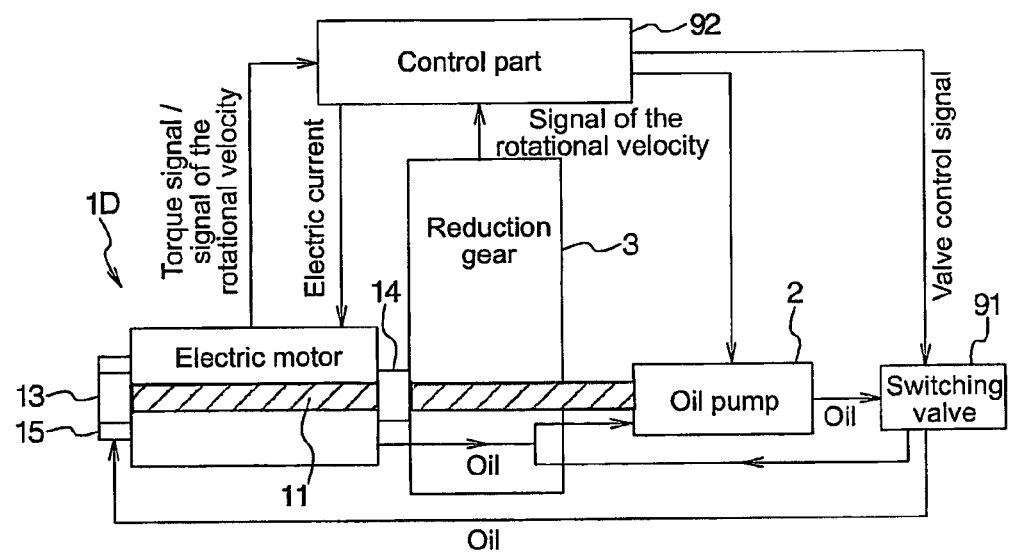
FIG. 8 is a block diagram illustrating the structure of the electric motor for a vehicle of a fifth exemplary embodiment.

FIG. 8 is a block diagram illustrating the structure of the electric motor for a vehicle of the fifth exemplary embodiment. As shown in FIG. 8, the present embodiment has switching valve 91 for adjusting the amount of oil which is discharged from oil pump 2 and control element 92 (control means) which controls the amount of oil by controlling oil pump 2 and switching valve 91 based on the rotational velocity and torque (load) of electric motor for a vehicle 1D. Since other structures are the same as those of the first exemplary embodiment, their explanation is omitted.

In switching valve 91, a valve control signal which is transmitted from control element 92 controls the switch-over of the valve flow path and the destination of the supply of the oil which is discharged from oil pump 2 is controlled by this switch-over of the flow path.

Control element 92 detects the rotational velocity of rotating shaft 11 and the torque on rotating shaft 11 and controls the torque on electric motor for a vehicle 1D. At the same time, control element 92 transmits the valve control signal to switching valve 91 and controls the switch-over of the valve flow path. Here, control element 92 may detect the torque on rotating shaft 11 by placing a torque sensor on the electric motor for a vehicle 1D or detect the torque on rotating shaft 11 by calculating the rotational velocity of reduction gear 3 and the current value which is supplied to electric motor for a vehicle 1D.

Figure 9:
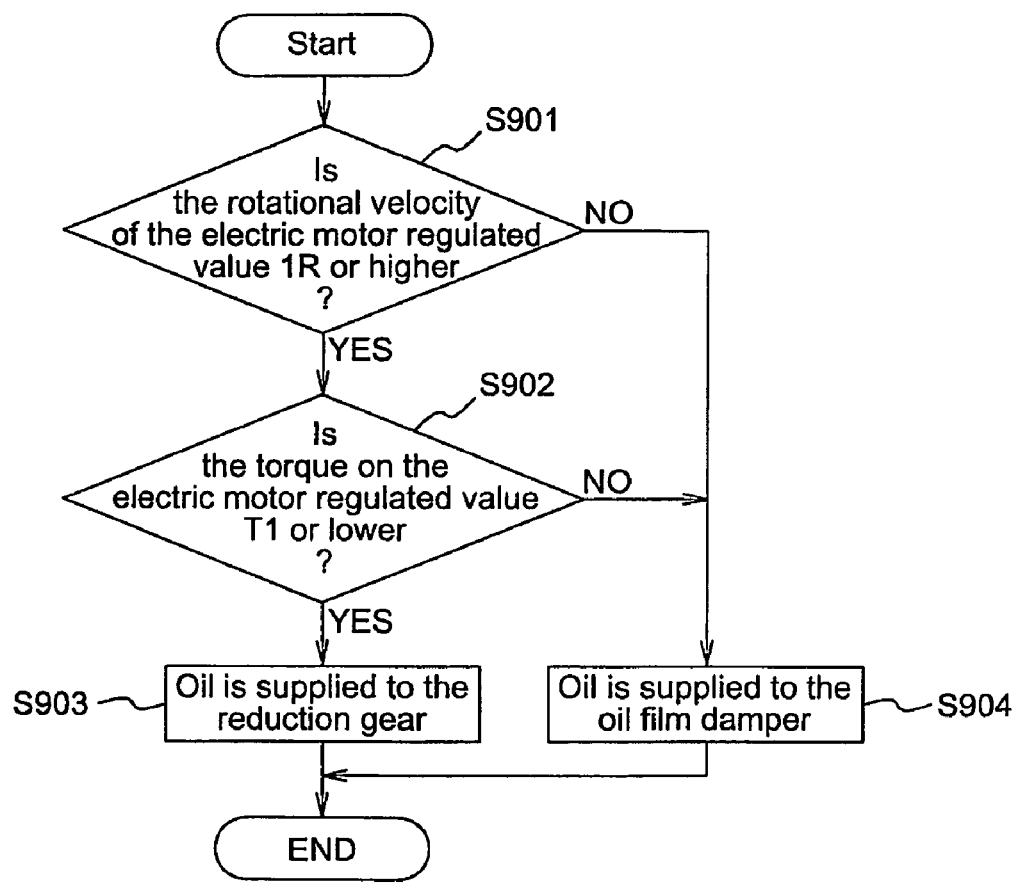
FIG. 9 is a flowchart showing the oil amount controlling process of the electric motor for a vehicle of the fifth exemplary embodiment.

The oil amount controlling process which is done by control element 92 of the electric motor for a vehicle of the fifth exemplary embodiment will be described based on the flowchart of FIG. 9. As shown in FIG. 9, control element 92 determines whether or not the rotational velocity of rotating shaft 11 is threshold and predetermined value of the rotational velocity R1 or higher (S901). When the rotational velocity of rotating shaft 11 is threshold value R1 or higher, control element 92 determines whether or not the torque on the rotating shaft 11 is threshold and predetermined load value T1 or lower (S902). When the torque on rotating shaft 11 is threshold load value T1 or lower, control element 92 switches over switching valve 91 so that oil is supplied toward oil film damper 15 and the amount of the oil discharged from oil pump 2 is increased in accordance with the rotational velocity of rotating shaft 11 (S903) thereby ending the oil amount controlling process of the present embodiment.

On the other hand, when the rotational velocity of rotating shaft 11 is less than threshold value R1 in step S901, or the torque on rotating shaft 11 is more than regulating load value T1 in step S902, switching valve 91 is switched over to the side of reduction gear 3 so that the oil discharged from oil pump 2 is not supplied to oil film damper 15 (S904) thereby ending the oil amount controlling process of the present embodiment.

Figure 10:
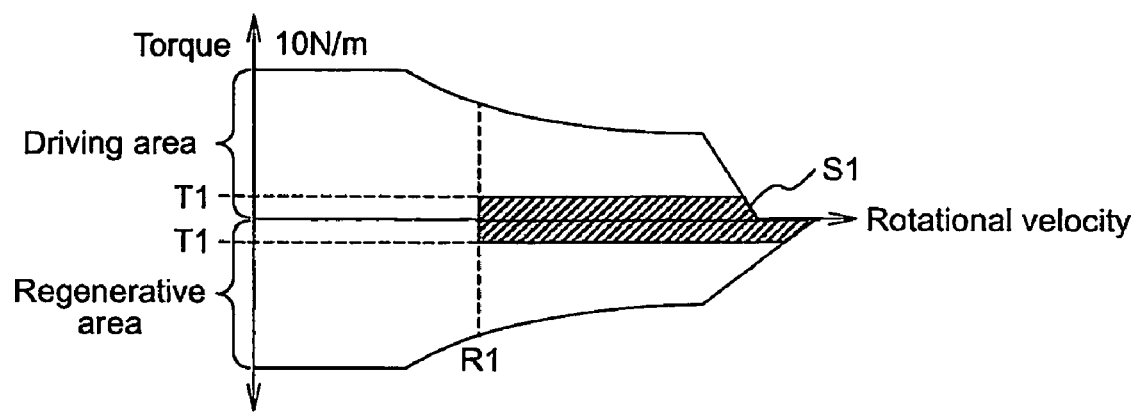
FIG. 10 is a rheogram showing the relationship between the rotational velocity and the load of the electric motor of the electric motor for a vehicle of the fifth exemplary embodiment.

Next, the relationship between the rotational velocity of rotating shaft 11 and the torque in the above described oil amount controlling process will be described based on FIG. 10. FIG. 10 indicates the driving area and the regenerative area of electric motor for a vehicle 1D. Among these areas, area S1 wherein the number for the rotation of rotating shaft 11 is threshold value R1 or higher and the torque is threshold load value T1 or lower is the area wherein switching valve 91 is switched over so that the oil is supplied toward oil film damper 15 and the discharged amount of the oil from oil pump 2 is increased in accordance with the rotational velocity. Threshold value R1 is, for example, 6000-8000 rpm and threshold load value T1 is, for example, 1-2 N/m.

When rotational velocity is less than threshold value R1 or the torque is more than threshold load value T1, that is, other than area S1, switching valve 91 is switched over to supply the oil to reduction gear 3. As a result, it is possible to decrease the torque on oil pump 2 and reduce the torque for driving oil pump 2. Therefore, the torque of electric motor for a vehicle 1D can be used for running a vehicle.

Generally, when the rotational velocity increases, vibration tends to be generated. Therefore, according to the first exemplary embodiment, when the rotational velocity increases, the amount of the oil supplied to oil film damper 15 is increased regardless of the size of the load on electric motor for a vehicle 1.

However, when the rotational velocity increases with load, that is, when the rotational velocity is large with high load, sometimes vibration is prevented. Therefore, in this case, there is no need to increase the supply of the oil to oil film damper 15.

Considering this fact, in the fifth exemplary embodiment, the supply amount of the oil to oil film damper 15 is increased only when the rotational velocity increases and the load is low in the electric motor for a vehicle 1D. In other words, only in the case of area S1 shown in FIG. 10 wherein the rotational velocity is threshold value R1 or higher and the torque is threshold load value T1 or lower, switching valve 91 is switched over to oil film damper 15 so that the oil is supplied to oil film damper 15 and the amount of the oil supplied to oil film damper 15 is increased in accordance with the rotational velocity.

The state wherein the rotational velocity is large and the load is low is that of immediately after the clutch of the driving wheels is disengaged to make the transition from 4WD to 2WD or the vehicle is running gentle downhill, that is, the state wherein the electric motor is running despite the decrease of the load on the electric motor.

Also, since, in the area other than area S1 shown in FIG. 10, the amount of oil supplied to oil film damper 15 is not increased, the discharge pressure of oil pump 2 is not increased. Therefore, it is possible to prevent the torque for driving oil pump 2 and save energy.

In this way, according to the electric motor for a vehicle 1D of the present embodiment, when the rotational velocity of rotating shaft 11 is threshold value R1 or higher and the load on rotating shaft 11 is threshold load value T1 or lower, switching valve 91 is switched over to the side of oil film damper 15 so that the amount of oil which is based on the rotational velocity of rotating shaft 11 is supplied to oil film damper 15. Therefore, it is possible to effectively prevent resonance of rotating shaft 11. Furthermore, when the rotational velocity of rotating shaft 11 is less than threshold value R1 or the load on rotating shaft 11 is more than threshold load value T1, the load on oil pump 2 is increased. As a result, energy can be saved. Also, among the driving forces which are generated in electric motor for a vehicle 1D, the driving force used for oil pump 2 can be used for the driving force of the vehicle. Therefore, the driving forces generated in the electric motor for a vehicle 1D can be effectively used.

Figure 11:
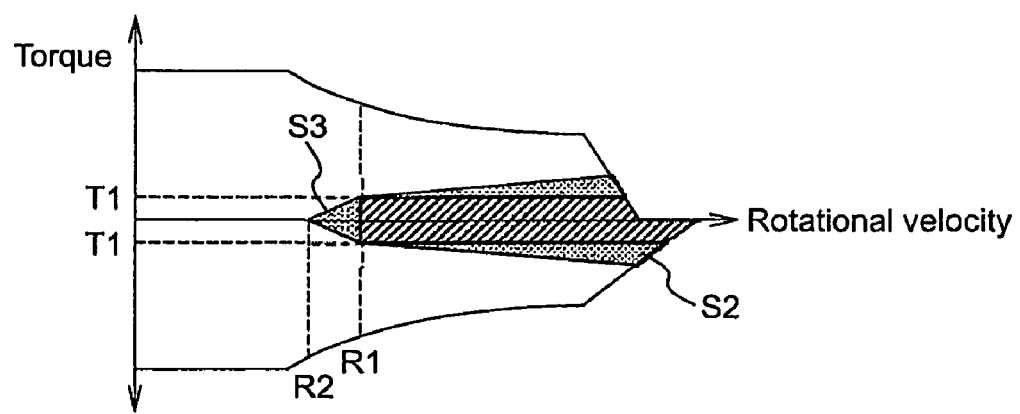
FIG. 11 is a rheogram showing the relationship between the rotational velocity and the load of the electric motor of the electric motor for a vehicle of a sixth exemplary embodiment.

FIG. 11 is a rheogram showing the relationship between the rotational velocity and torque in the electric motor for a vehicle of the sixth exemplary embodiment. As shown in FIG. 11, the present embodiment is different from the fifth exemplary embodiment in that as the rotational velocity of rotating shaft 11 increases, the threshold load value is gradually increased. Since other structures are the same as those of the fifth exemplary embodiment, their explanation is omitted.

As shown in FIG. 11, according to the present embodiment, when the rotational velocity of rotating shaft 11 exceeds threshold value R2 but is less than threshold value R1, control element 92 changes the threshold load value so that the threshold load value is gradually increased from 0 to threshold load value T1.

Also, when the rotational velocity of rotating shaft 11 is threshold value R1 or higher, control element 92 changes the threshold load value so that the threshold load value is increased gradually from threshold load value T1 as the rotational velocity of rotating shaft 11 increases.

Generally, when the rotational velocity increases, vibration tends to increase. According to the present embodiment, the threshold load value which is the threshold for determining whether or not the supply amount of oil is increased is gradually increased as the rotational velocity increases. As a result, the area wherein the supply amount of oil is increased is expanded from area S1 of FIG. 10 to area S2 and at the same time the supply amount of oil can be increased in area S3.

In this way, according to the electric motor for a vehicle of the present embodiment, as the rotational velocity of rotating shaft 11 increases, the threshold load value is gradually increased. Therefore, it is possible to effectively produce the resonance damping effect by oil film damper 15 in the area where the rotational velocity is large.

Furthermore, when the rotational velocity of rotating shaft 11 is less than threshold value R1, the threshold load value is gradually increased from 0 as the rotational velocity of rotating shaft 11 increases. As a result, even if the rotational velocity is small, it is possible to effectively produce the resonance damping effect by oil film damper 15.

Figure 12:
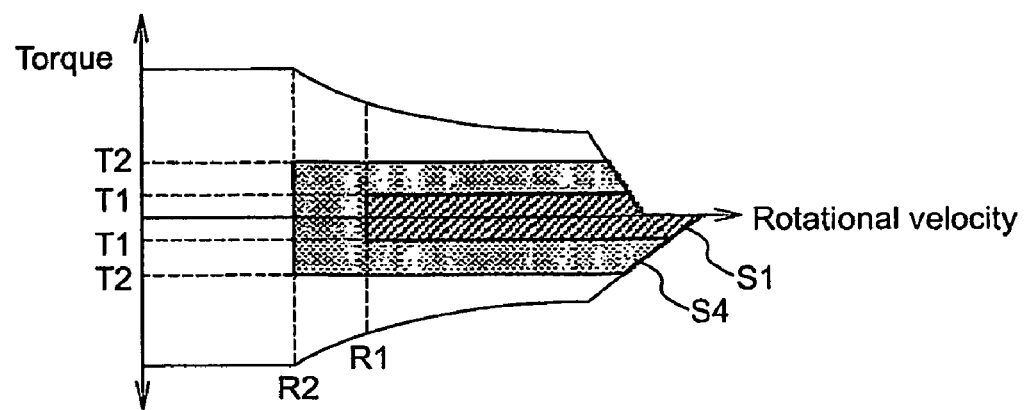
FIG. 12 is a rheogram showing the relationship between the rotational velocity and the load of the electric motor of the electric motor for a vehicle of a seventh exemplary embodiment.

FIG. 12 is a rheogram showing the relationship between the rotational velocity and the torque of the electric motor for a vehicle of the seventh exemplary embodiment. As shown in FIG. 12, the present embodiment is different from the fifth exemplary embodiment in that transition area S4 is created outside area S1, wherein the switch-over amount of switching valve 91 is changed so that the relation of the oil supplied to oil film damper 15 is gradually increased. Since other structures are the same as those of the fifth exemplary embodiment, their explanation is omitted.

According to the present embodiment, as shown in FIG. 12, the relation of the supply amount of the oil to oil film damper 15 by switching valve 91, which is shown in FIG. 8, is set as 100% by control element 92 in area S1 wherein the rotational velocity is threshold value R1 or higher and the torque is threshold load value T1 or lower. Then, all the oil which is discharged from oil pump 2 based on the rotational velocity is supplied to oil film damper 15.

Figure 13:
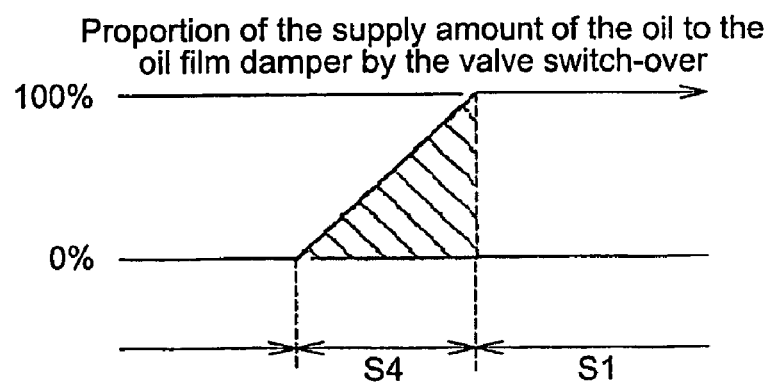
FIG. 13 is a view of the relation of the supply amount of the oil to the oil film damper by the valve switch-over of the electric motor for a vehicle of the seventh exemplary embodiment.

In transition area S4, control element 92 controls the oil amount by continuously changing the switch-over ratio of switching valve 91 0-100% as shown in FIG. 13 so that the relation of the oil amount supplied to oil film damper 15 is gradually increased.

Transition area S4 has either a range wherein the rotational velocity of rotating shaft 11 is less than threshold value R1 and threshold value R2 or higher, or a range wherein the torque on rotating shaft 11 is more than threshold load value T1 and threshold load value T1 or lower.

In this way, according to the electric motor for a vehicle of the present embodiment, when the rotational velocity of rotating shaft 11 is in a predetermined range of less than threshold value R1, or when the load on rotating shaft 11 is in a predetermined range of more than threshold load value T1, the relation of the oil supplied to oil film damper 15 is gradually increased. As a result, in transition area S4, it is possible to supply the necessary amount of oil and save energy. Furthermore, since the load on oil pump 2 is gradually changed in transition area S4, when the rotational velocity of rotating shaft 11 is changed, it is possible to prevent the gradual change of the driving force of the vehicle caused by loss in oil pump 2.

Figure 14:
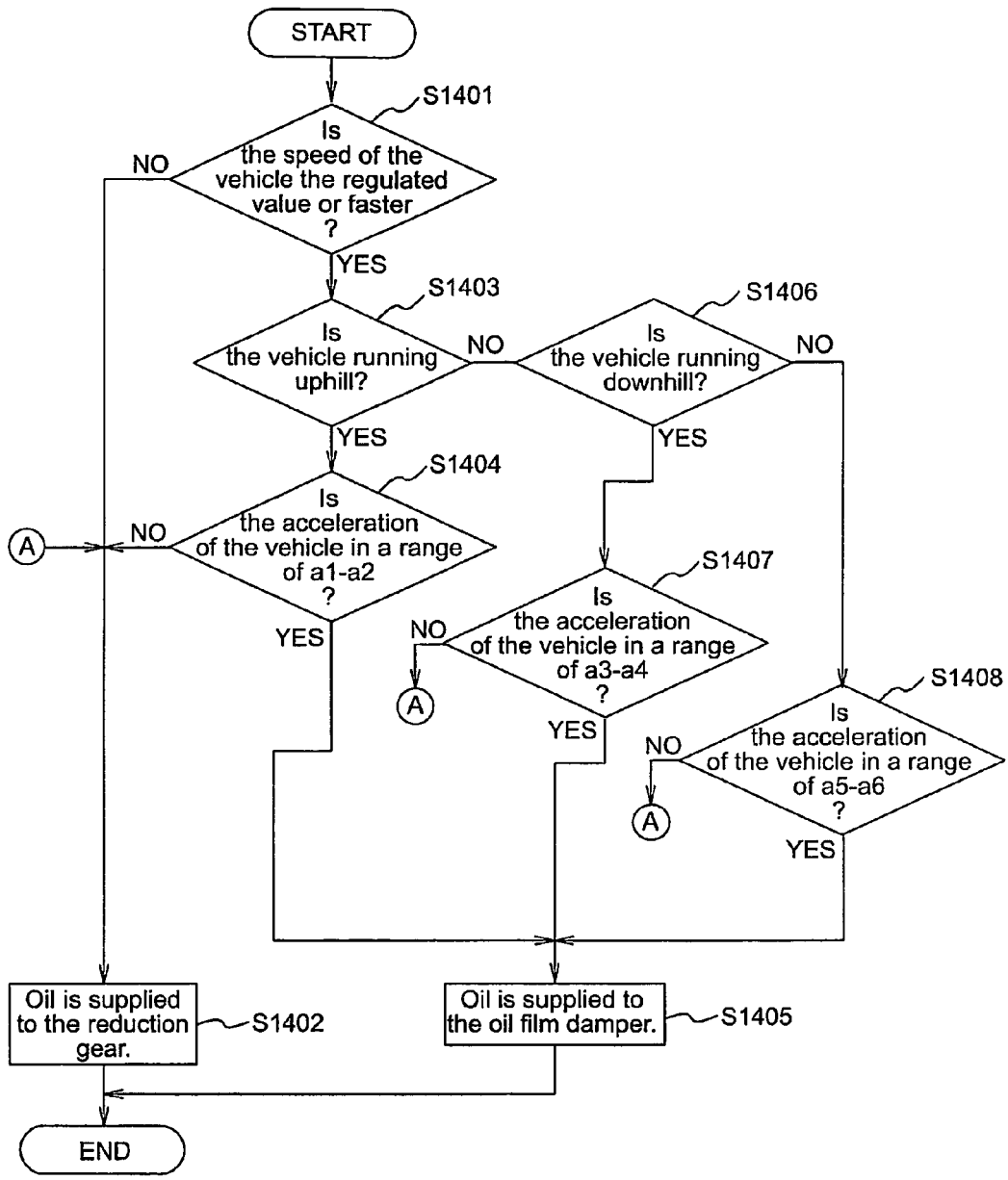
FIG. 14 is a flowchart showing the oil amount controlling process of the electric motor for a vehicle of an eighth exemplary embodiment.

FIG. 14 is a flowchart showing the oil amount controlling process which is conducted by control element 92 of the electric motor for a vehicle of the eighth exemplary embodiment. The present embodiment is different from the fifth exemplary embodiment in that whether or not oil is supplied to oil film damper 15 is determined based on the speed of the vehicle equipped with the electric motor for a vehicle, whether the vehicle is running uphill or downhill and the acceleration of the vehicle while it is running uphill or downhill. Since other structures are the same as those of the fifth exemplary embodiment, their explanation is omitted.

Control element 92 obtains the speed of the vehicle equipped with the electric motor for a vehicle from the speed sensor and determines whether or not the speed is a predetermined and threshold speed (regulated speed) or faster (S1401). When the speed of the vehicle is less than the threshold speed value, it is considered that the rotational velocity of rotating shaft 11 is small. Therefore, switching valve 91 is switched over to reduction gear 3 so that the oil is supplied to reduction gear 3 (S1402) thereby ending the oil amount controlling process of the present embodiment.

On the other hand, when the speed of the vehicle is the threshold speed value or more, the slope of the road where the vehicle is running is detected based on the information obtained from a sensor which detects the inclination state of the vehicle such as a gyro sensor and it is determined whether or not the road is uphill (S1403). When it is determined that the vehicle is running uphill, it is determined whether or not the acceleration of the vehicle is in a range of acceleration a a1-a2 shown in FIG. 15 (S1404).

When the acceleration of the vehicle detected by the acceleration sensor, it is considered that the rotational velocity of rotating shaft 11 is large and the load is low. Therefore, switching valve 91 is switched over so that the oil is supplied to oil film damper 15 and the amount of the oil discharged by oil pump 2 is increased based on the rotational velocity of rotating shaft 11 (S1405) thereby ending the oil amount controlling process of the present embodiment.

On the other hand, when the acceleration is not in a range of a1-a2, it is considered that the rotational velocity of rotating shaft 11 is large but the load is not low. Therefore, switching valve 91 is switched over so that oil is supplied to reduction gear 3 and the discharge pressure of oil pump 2 is not increased but kept small (S1402) thereby ending the oil amount controlling process of the present embodiment.

Furthermore, when it is determined that the vehicle is not running uphill in step S1403, it is determined whether or not the vehicle is running downhill (S1405). When it is determined that the vehicle is running downhill and that the acceleration is in a range of a3-a4 shown in FIG. 15 (S1407), it is considered that the rotational velocity of rotating shaft 11 is large and the load is low. Therefore, switching valve 91 is switched over so that oil is supplied to oil film damper 15 and the amount of the oil discharged by oil pump 2 is increased based on the rotational velocity of rotating shaft 11 (S1405) thereby ending the oil amount controlling process of the present embodiment.

Figure 15:
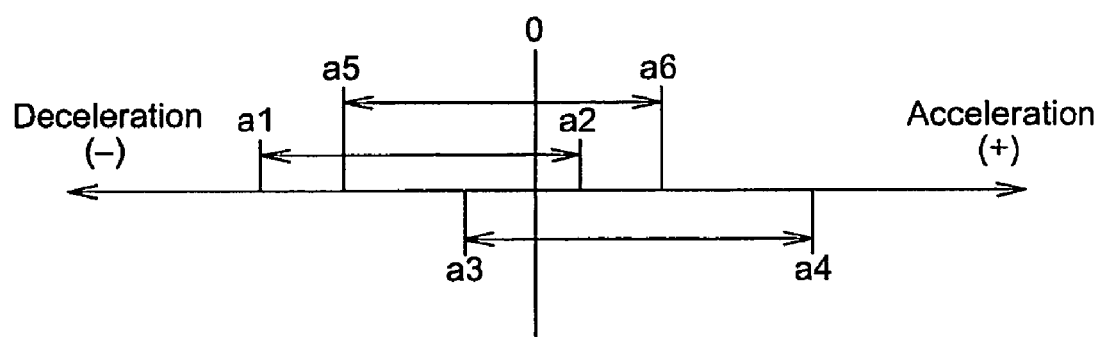
FIG. 15 is a view indicating the ranges of the acceleration used in the oil amount controlling process of the electric motor for a vehicle of the eighth exemplary embodiment.

On the other hand, when it is determined that the vehicle is not running downhill in step S1406 and that acceleration is in a range of a5-a6 shown in FIG. 15 (S1408), it is considered that the rotational velocity of rotating shaft 11 is large and the load is low. Therefore, switching valve 91 is switched over so that oil is supplied to oil film damper 15 and the amount of the oil discharged by oil pump 2 is increased based on the rotational velocity of rotating shaft 11 (S1405) thereby ending the oil amount controlling process of the present embodiment.

Also, when the acceleration is not in a range of a3-a4 in step S1407 and when the acceleration is not in a range of a5-a6 in step S1408, it is considered that the rotational velocity of rotating shaft 11 is large but the load is not low. Therefore, switching valve 91 is switched over so that oil is supplied to reduction gear 3 and the discharge pressure of oil pump 2 is not increased but kept small (S1402) thereby ending the oil amount controlling process of the present embodiment.

In this way, according to the electric motor for a vehicle of the present embodiment, whether or not oil is supplied to oil film damper 15 is determined and the amount of the oil supplied to oil film damper 15 is controlled based on the speed of the vehicle equipped with the electric motor, whether the vehicle is running uphill or downhill and the acceleration of the vehicle when it is running uphill or downhill. As a result, it is possible to effectively prevent resonance of rotating shaft 11 depending on the running condition of the vehicle.

Figure 16:
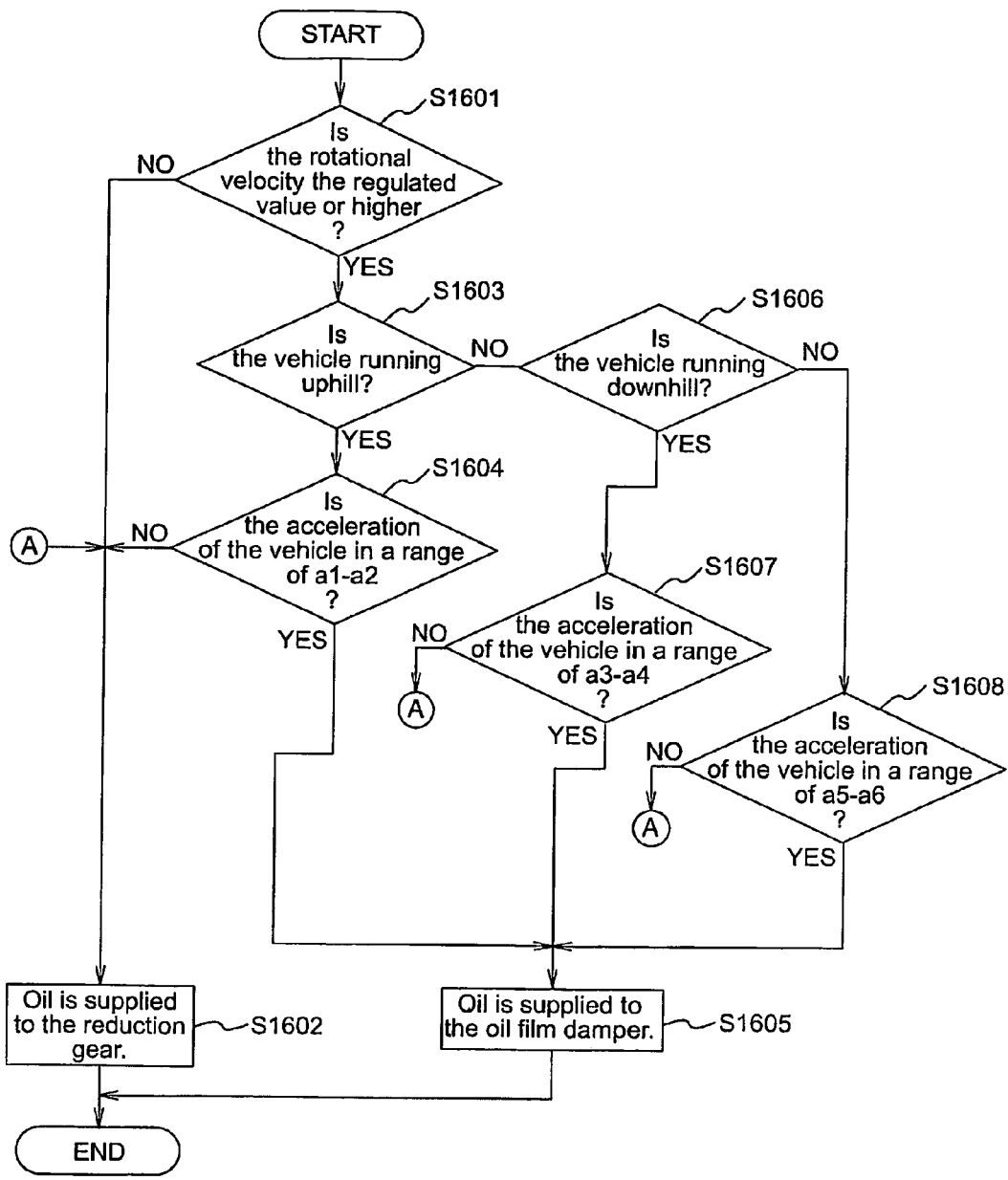
FIG. 16 is a flowchart showing the oil amount controlling process of the electric motor for a vehicle of a ninth exemplary embodiment.

FIG. 16 is a flowchart showing the oil amount controlling process which is conducted by control element 92 of the electric motor for a vehicle of the ninth exemplary embodiment. The present embodiment is different from the eighth exemplary embodiment in that whether oil is supplied to oil film damper 15 is determined based on the rotational velocity of the electric motor for a vehicle instead of the speed of the vehicle. Since other structures and the processes are the same as those of the eighth exemplary embodiment, their explanation is omitted.

According to the eighth exemplary embodiment, when the speed of the vehicle is less than the threshold speed value, it is considered that the rotational velocity of rotating shaft 11 is not large and oil is not supplied to oil film damper 15. However, there is a case where the rotational velocity increases even when the speed of the vehicle is slow. Based on this fact, according to the present embodiment, whether or not the rotational velocity of rotating shaft 11 is large is directly determined.

As shown in FIG. 16, control element 92 determines whether or not the rotational velocity of rotating shaft 11 is a predetermined and threshold value of higher (S1601).

In step S1601, when the rotational velocity of rotating shaft 11 is less than the threshold value, switching valve 91 is switched over so that oil is supplied to reduction gear 3 and the discharge pressure of oil pump 2 is not increased but kept small (S1602) thereby ending the oil amount controlling process of the present embodiment.

On the other hand, when it is determined in step S1601 that the rotational velocity of rotating shaft 11 is the threshold value or lower, whether or not the vehicle is running uphill by detecting the slope of the road where the vehicle is running based on the information obtained from the gyro sensor (S1603). When it is determined that the vehicle is running uphill, whether or not the acceleration of the vehicle detected by the acceleration sensor is in a range of a1-a2 shown in FIG. 15 is determined (S1604).

When the acceleration is in a range of a1-a2, it is considered that the load is low. Therefore, switching valve 91 is switched over so that oil is supplied to oil film damper 15 and the amount of the oil discharged by oil pump 2 is increased based on the rotational velocity of rotating shaft 11 (S1605) thereby ending the oil amount controlling process of the present embodiment.

On the other hand, when the acceleration is not in a range of a1-a2, it is considered that the load on rotating shaft 11 is not low. Therefore, switching valve 91 is switched over so that oil is supplied to reduction gear 3 and the discharge pressure of oil pump 2 is not increased but kept small (S1602) thereby ending the oil amount controlling process of the present embodiment.

Furthermore, when it is determined in step S1603 that the vehicle is not running uphill, it is determined whether or not the vehicle is running downhill (S1606). When it is determined that the vehicle is running downhill and that the acceleration is in a range of a3-a4 shown in FIG. 15, it is considered that the load on rotating shaft 11 is low. Therefore, switching valve 91 is switched over so that oil is supplied to oil film damper 15 and the amount of the oil discharged by oil pump 2 is increased based on the rotational velocity of rotating shaft 11 (S1605) thereby ending the oil amount controlling process of the present embodiment.

On the other hand, when it is determined in step S1606 that the vehicle is not running downhill and that the acceleration is in a range of a5-a6 shown in FIG. 15, it is considered that the load on rotating shaft 11 is low. Therefore, switching valve 91 is switched over so that oil is supplied to oil film damper 15 and the amount of the oil discharged by oil pump 2 is increased based on the rotational velocity of rotating shaft 11 (S1605) thereby ending the oil amount controlling process of the present embodiment.

Moreover, when the acceleration is not in a range of a3-a4 in step S1608 and when the acceleration is not in a range of a5-a6 in step S1609, it is considered that the load on rotating shaft 11 is not low. Therefore, switching valve 91 is switched over so that oil is supplied to reduction gear 3 and the discharge pressure of oil pump 2 is not increased but kept small (S1602) thereby ending the oil amount controlling process of the present embodiment.

In this way, according to the electric motor for a vehicle of the present embodiment, when the rotational velocity of rotating shaft 11 is the threshold value or higher, depending on whether the vehicle is running uphill or downhill and whether or not the acceleration of the vehicle at that time is in a predetermined range, switching valve 91 is switched over and oil is supplied either to oil film damper 15 or to reduction gear 3. Therefore, it is possible to effectively prevent resonance of rotating shaft 11 depending on the running condition of the vehicle.

Figure 17:
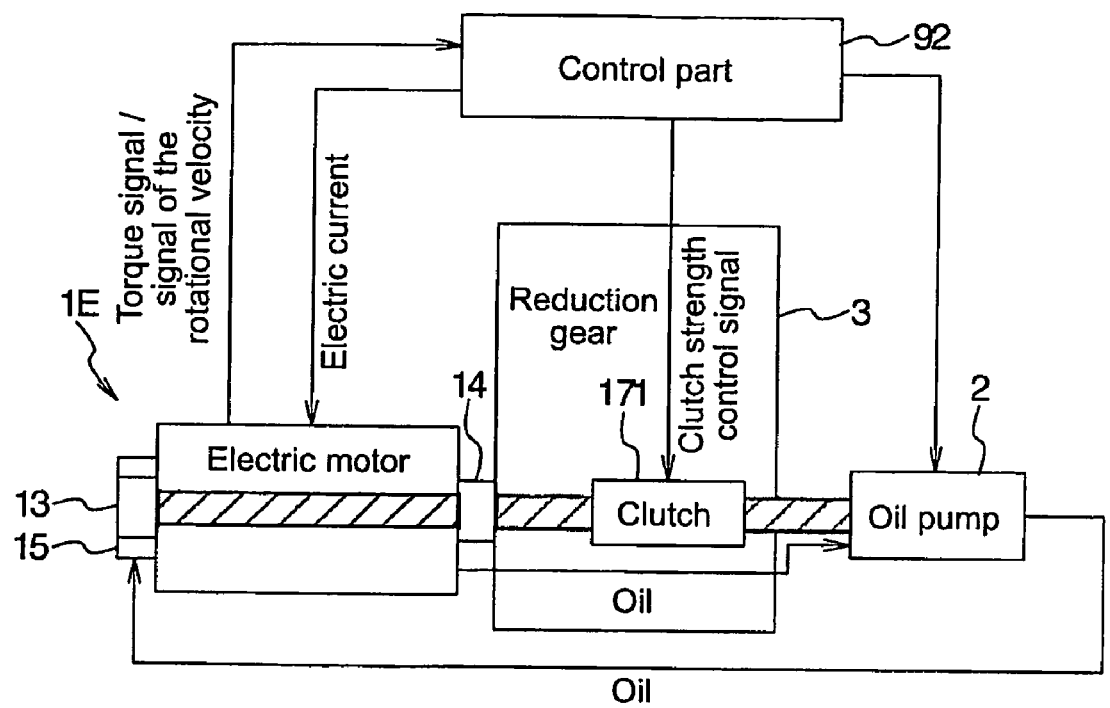
FIG. 17 is a block diagram illustrating the structure of the electric motor for a vehicle of a tenth exemplary embodiment.

FIG. 17 is a block diagram illustrating the structure of the electric motor for a vehicle of the tenth exemplary embodiment. As shown in FIG. 17, the present embodiment is different from the fifth exemplary embodiment in that clutch 171 is placed between electric motor for a vehicle 1E and oil pump 2 and switching valve 91 is omitted. Since other structures are the same as those of the fifth exemplary embodiment, their explanation is omitted.

Here, clutch 171 transmits the rotation of rotating shaft 11 to oil pump 2 and the engagement strength of the clutch is controlled by the clutch strength controlling signal from control element 92 and the rotational velocity of oil pump 2 is controlled.

In this way, according to electric motor for a vehicle 1E of the present embodiment, rotating shaft 11 is connected to oil pump 2 through clutch 171 and the engagement strength of clutch 171 is controlled by control element 92. Therefore, it is possible to easily control the rotational velocity of oil pump 2. As a result, it is possible to supply a proper amount of the oil to oil film damper 15.

The exemplary embodiments describe the case wherein the oil film damper is placed in one end of the rotating shaft of the electric motor for a vehicle. However, it is possible to place the oil film damper in both ends of the rotating shaft.

Furthermore, the exemplary embodiments describe the case wherein the damping device of the present invention is used for an electric motor for a vehicle. However, the present invention is not limited to these embodiments, but can be used for the case wherein resonance of the rotating shaft such as a turbine is prevented.

Moreover, the exemplary embodiments describe the case wherein the oil pump is connected to the rotating shaft directly or through the clutch. However, the present invention is not limited to these embodiments, but can be used for the case wherein the rotating shaft of the oil pump is not connected to the rotating shaft of the electric motor and the oil pump is placed in a different body other than the electric motor for a vehicle. Here, in this case, it is necessary to separately create a source of the driving force which drives the oil pump.

Thus, various embodiments of the invention have been described. These and other embodiments are within the scope of the following claims.

The invention claimed is:

1. A system comprising:
an electric motor for a vehicle that supplies a driving force for the vehicle by rotating a rotating shaft;
roller bearings that rotatably support the rotating shaft;
a housing that supports the roller bearings;
a circular-shaped member that creates an oil film between at least one of the roller bearings and the housing;
an oil pump that supplies oil to the circular-shaped member, wherein the oil pump being configured and arranged to increase the supply of the oil when the rotating shaft rotates at a relatively high rotational velocity; and
a reduction gear which transmits the driving torque of the electric motor for a vehicle to a set of driving wheels; and
a case which contains the reduction gear and connects an end of the rotating shaft that is adjacent to the circular-shaped member to the reduction gear and discharges the oil into the case.

2. The system of claim 1, wherein
the oil pump is powered by the rotating shaft.

3. The system of claim 1, wherein
an oil path for supplying oil from the oil pump to the circular-shaped member is located between an external surface and an internal surface of the housing in an axial direction of the rotating shaft.

4. The system of claim 1, wherein
the oil pump is enclosed within the housing.

5. The system of claim 1, wherein
the oil pump is located adjacent to the rotating shaft and opposite the circular-shaped member, wherein
the oil circulates such that oil supplied from the oil pump to the circular-shaped member is discharged into an enclosure formed by the housing, passes through the enclosure, and is extracted from the enclosure by the oil pump and again supplied to the circular-shaped member.

6. The system of claim 1, wherein
the oil pump is located adjacent to the circular-shaped member and the rotating shaft.

7. A system comprising:
an electric motor for a vehicle that supplies a driving force for the vehicle by rotating a rotating shaft;
roller bearings that rotatably support the rotating shaft;
a housing that supports the roller bearings;
a circular-shaped member that creates an oil film between at least one of the roller bearings and the housing;
an oil pump that supplies oil to the circular-shaped member, wherein the oil pump being configured and arranged to increase the supply of the oil when the rotating shaft rotates at a relatively high rotational velocity; and
a control element that controls the supply of the oil and increases the supply when the rotational velocity of the rotating shaft is at least a threshold rotating value and a load on the rotating shaft is a threshold loading value or lower.

8. The system of claim 7, wherein
the control element increases the threshold loading value when the rotating shaft rotates at a relatively high rotational velocity.

9. The system of claim 8, wherein
the control element increases the threshold loading value in relation to the increase of the rotational velocity of the rotating shaft.

10. The system of claim 7, wherein
the control element increases the supply when the speed of the vehicle becomes a threshold speed value or faster and the acceleration rate of the vehicle becomes a threshold acceleration rate value or lower.

11. The system of claim 7, wherein
the control element increases the supply when the rotational velocity of the rotating shaft becomes a threshold rotational velocity value or higher and the acceleration rate of the vehicle becomes a threshold acceleration rate value or slower.

12. The system of claim 11, wherein
the control element determines weather the vehicle is driving uphill or downhill and, if the control element determines the vehicle is driving uphill, the control element decreases the threshold acceleration rate value and if the control element determines the vehicle is driving downhill, the control element increases the threshold acceleration rate value.

13. The system of claim 7, further comprising:
a first oil path element forming a first oil path through which oil supplied from the oil pump to the circular-shaped member passes;
a drain tank where the oil discharged from the circular-shaped member is stored;
a second oil path element forming a second oil path through which oil supplied from the oil pump to the drain tank passes; and
a switching valve which is located between the first oil path and second oil path and the control element controls the supply by controlling the switching valve.

14. The system of claim 7, further comprising
a clutch, wherein the oil pump is powered by the rotating shaft, the clutch is located between the rotating shaft and the oil pump, and
the control element controls the supply by controlling an engagement strength of the clutch.

* * * * *